(12) United States Patent
Taboriskiy et al.

(10) Patent No.: US 10,440,757 B2
(45) Date of Patent: Oct. 8, 2019

(54) SECOND-SCREEN CONTROL AUTOMATIC PAIRING USING PUSH NOTIFICATIONS

(71) Applicant: Google Inc., Mountain View, CA (US)

(72) Inventors: Alexander Taboriskiy, Zurich (CH); Daniel Robert Danciu, Zurich (CH); Ramona Bobohalma, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 14/623,912

(22) Filed: Feb. 17, 2015

(65) Prior Publication Data

US 2016/0241605 A1    Aug. 18, 2016

(51) Int. Cl.
*H04W 4/80* (2018.01)
*H04W 76/10* (2018.01)
*H04L 29/08* (2006.01)

(52) U.S. Cl.
CPC ............ *H04W 76/10* (2018.02); *H04L 67/26* (2013.01); *H04W 4/80* (2018.02)

(58) Field of Classification Search
CPC ....... H04W 4/00; H04W 88/04; H04W 88/02; H04L 63/10
USPC ........................................................ 709/227
See application file for complete search history.

(56) References Cited

U.S. PATENT DOCUMENTS

| | | | | |
|---|---|---|---|---|
| 7,046,134 | B2* | 5/2006 | Hansen | G06F 3/1454 340/506 |
| 8,095,113 | B2* | 1/2012 | Kean | G06F 21/31 455/406 |
| 9,253,531 | B2* | 2/2016 | Relyea | H04N 21/4126 |
| 9,684,926 | B1* | 6/2017 | Nguyen | G06Q 30/0635 |
| 2010/0207874 | A1 | 8/2010 | Yuxin et al. | |
| 2011/0214148 | A1* | 9/2011 | Gossweiler, III | H04N 21/235 725/46 |
| 2011/0252118 | A1* | 10/2011 | Pantos | G06F 17/30053 709/219 |
| 2011/0273625 | A1* | 11/2011 | McMahon | G06F 21/445 348/734 |

(Continued)

OTHER PUBLICATIONS

Dunning, Jason, "PS Vita Firmware Update 3.15 Improves PS4 Remote Play & Second Screen Connectivity," Apr. 30, 2014, 7 pgs., accessed at http://www.playstationlifestyle.net/2014/04/30/ps-vita-firmware-update-3-15-improves-ps4-remote-play-second-screen-connectivity/ on Jun. 6, 2014.

(Continued)

*Primary Examiner* — Sm A Rahman
*Assistant Examiner* — Chen-Liang Huang
(74) *Attorney, Agent, or Firm* — Lowenstein Sandler LLP

(57) ABSTRACT

A computer-implemented method for pairing multimedia devices is provided herein. The method may include operations of detecting a connection between a first-screen device and a pairing service, the first-screen device connecting to the pairing service through a local network and of generating a pairing code that is valid for a pairing session. The method may further include sending a request to a push notification server to send a push notification comprising the pairing code to a second-screen device, receiving the pairing code from the second-screen device, and associating the first-screen device and the second-screen devices as paired devices.

18 Claims, 5 Drawing Sheets

(56) References Cited

U.S. PATENT DOCUMENTS

| | | | |
|---|---|---|---|
| 2011/0306882 A1* | 12/2011 | Hannon | A61B 6/4494 600/443 |
| 2012/0310880 A1* | 12/2012 | Giampaolo | G06F 17/30528 707/610 |
| 2012/0311010 A1* | 12/2012 | Shah | H04L 67/1072 709/201 |
| 2013/0173070 A1* | 7/2013 | Tennyson | G05B 19/02 700/284 |
| 2013/0254288 A1* | 9/2013 | Harrison | H04L 51/00 709/204 |
| 2014/0028817 A1* | 1/2014 | Brockway, III | H04N 5/23206 348/61 |
| 2014/0208384 A1* | 7/2014 | Youssefian | H04L 63/0869 726/3 |
| 2014/0220894 A1* | 8/2014 | Chen | H04W 8/005 455/41.2 |
| 2015/0020081 A1* | 1/2015 | Cho | G06F 9/542 719/318 |
| 2015/0082457 A1* | 3/2015 | Nakamura | H04L 63/10 726/27 |
| 2015/0163843 A1* | 6/2015 | Zhu | H04L 63/0869 455/41.2 |
| 2015/0264728 A1* | 9/2015 | Milligan | H04W 76/023 455/411 |
| 2015/0295802 A1* | 10/2015 | Balakrishnan | H04L 43/0811 370/248 |
| 2015/0373089 A1* | 12/2015 | Koss | H04W 12/08 709/205 |
| 2016/0342759 A1* | 11/2016 | Shapley | G06F 19/3406 |
| 2017/0048280 A1* | 2/2017 | Logue | H04W 4/008 |

OTHER PUBLICATIONS

Benjamin, Ernest, "PlayStation 4 Remote Play and Second Screen with PlayStation Vita—YouTubeDiscovery and Pairing Literature Review for Media Scape," Jan. 25, 2014, 2 pgs., accessed at https://www.youtube.com/watch?v=q1brN326Fw4 on Jun. 10, 2014.

Miller et al., "Discovery and Pairing Literature Review for Media Scape," 12 pgs., accessed at https://github.com/bbcrd/device-discovery-pairing/blob/master/document.md on Jun. 6, 2014.

From Wikipedia, the free encyclopedia, "Universal Plug and Play," Jun. 1, 2014, 10 pgs., accessed at http://en.wikipedia.org/Wiki/Universal_Plug_and_Play on Jun. 6, 2014.

* cited by examiner

US 10,440,757 B2

SECOND-SCREEN CONTROL AUTOMATIC PAIRING USING PUSH NOTIFICATIONS

TECHNICAL FIELD

This disclosure relates to the field of content-sharing platforms and, in particular, to methods and systems for pairing multimedia devices.

BACKGROUND

As mobile devices, include smartphones, tablets, mobile gaming devices, etc., have become more prevalent, more media is consumed on such devices. Users are increasingly comfortable with the navigation and control of such devices for access media items. Coinciding with the rise in such "small-screen" devices there has been a rise in the size of television sets and monitors. Technologies have improved the resolution of such "big-screen" devices and their refresh rates as well, offering a richer experience.

Some technologies enable consumers with both large-screen and small-screen devices to connect the two, enabling one to be used to control the other. Different approaches have been taken to enable the pairing and cooperation of these types of devices. However, current pairing approaches have not been entirely satisfactory. For example, one current pairing approach uses a protocol known as DIAL (Discovery and Launch) that can discover and launch applications on the same WiFi network. However, this technology requires that a large-screen device explicitly support DIAL on a network level, which significantly reduces the number of applicable large screen devices.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

A computer-implemented method for pairing a first-screen device with a second-screen device is provided herein. Embodiments of the method include operations of detecting a connection between a first-screen device and a pairing service, the first-screen device connecting to the pairing service through a local network, and generating a pairing code that is valid for a pairing session. The operations further include sending a request to a push notification server to send a push notification comprising the pairing code to a second-screen device, receiving the pairing code from the second-screen device, and associating the first-screen device and the second-screen devices as paired devices.

In additional implementations or embodiments, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the present disclosure, a non-transitory computer-readable storage medium stores instructions for performing the operations of the above-described implementations.

BRIEF DESCRIPTION OF THE DRAWINGS

Aspects of the present disclosure are illustrated, by way of example and not by way of limitation, in the figures of the accompanying drawings.

Figure 1:
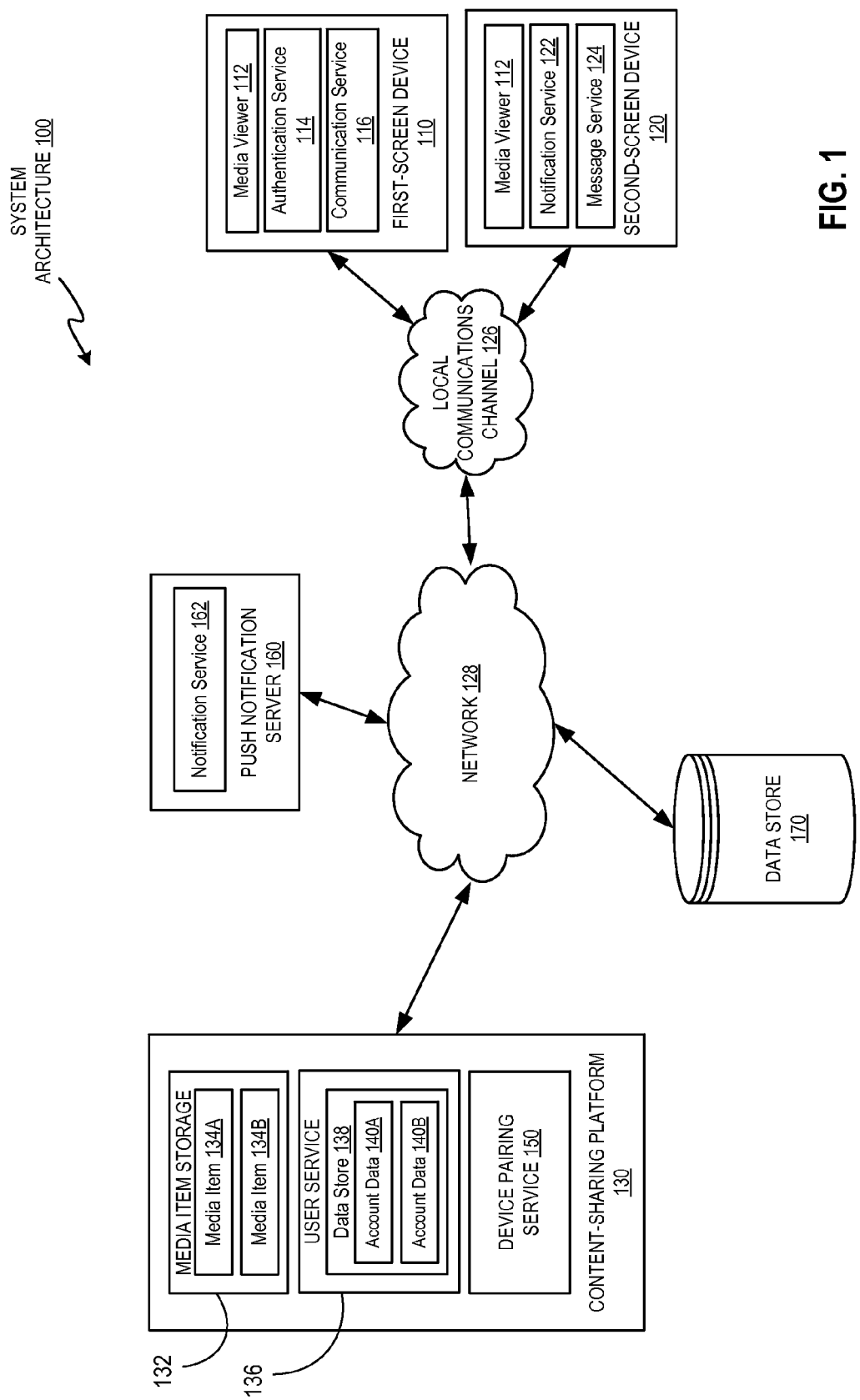
FIG. 1 illustrates an exemplary system architecture for pairing multimedia devices, in accordance with an embodiment of the disclosure.

These drawings may be better understood when observed in connection with the following Detailed Description.

DETAILED DESCRIPTION

Implementations are described for pairing two multimedia devices together such that a user of both devices may use one device to control the other over a network connection, such as a wireless network connection. People consume media items, such as movies, television, videos, music, photography, and text on a variety of different devices. The devices include televisions with over-the-air signals and/or cable or satellite signals (including, for example, television sets and smart TVs), personal computers, laptops, tablets, smartphones, gaming consoles, set-top box (STBs), wearable computers, etc. Each of these devices may provide a different interface, with different advantages and disadvantages. The devices may be controlled in a variety of ways. For example, users of these devices may control the devices with a dedicated controller (e.g., a remote control), touch-based inputs, audio-inputs, motion-sensing controllers, or other types of controls used to navigate different types of user interfaces. The devices may include or be coupled to displays ranging from about 3 inches to more than 70 inches.

Given the range of devices, users may seek to combine the strengths of devices by using one to control another. For example, a user may want to control the user's television with the user's phone. In order for this to occur, the television and the phone may need to communicate directly or indirectly. Problems may occur if a neighbor of the user is able to control the user's television with the neighbor's phone, without the permission of the user. Thus, it may be desirable to allow users to pair their devices, such as pairing a television or a set-top box connected with the television and a smartphone, while preventing unauthorized pairing.

In some embodiments, a pairing service may be provided to communicate with both the television and the smartphone to establish a pairing relationship or association between them such that commands entered by a user using one device may be registered and enacted by another device.

For example, this pairing service may detect a connection between a user's television and the pairing service. The television may connect to the pairing service through a local network that in turn connects to a larger network. The pairing service may obtain some information about the local network, such as an Internet Protocol (IP) address. In response to a request from the television, the pairing service may generate a pairing code. In some embodiments, the pairing code may be valid only for a single pairing session. After generating the pairing code, the pairing service may send a request to a push notification server to send a push notification, including the pairing code, to the user's smartphone, and any other devices associated with the user as indicated by a user account accessible to the pairing service. The push notification server may be a third-party push notification server. The push notification may be received by the user's smartphone, which may extract the pairing code from the push notification. This may be performed by the smartphone without an affirmative user command being entered contemporaneously with the receipt of the notification or without express knowledge of the user.

After the push notification is sent to the user's smartphone, the smartphone may communicate the pairing code to the pairing service by sending a request to pair with the television, thereby confirming to the pairing service the request of the user to pair the devices. The devices may be associated in a database of the pairing service or in another user database as being paired devices and the pairing service may send a confirmation to the smartphone. This confirmation may provide a message to the user indicating that the pairing service has allowed for the two devices to be paired. The confirmation may also include credentials for use in the pairing of the two devices. For example, the smartphone may use the credentials to authenticate itself to or otherwise pair with the television. The smartphone may send the credentials to the television over the local network or over another communication channel. The television may thereafter receive commands, files, and/or other data from the smartphone such that the smartphone is able to control the television. For example, the smartphone may be able to issue commands to the television, such as to change a channel, change the volume, modify settings, etc. Additionally, the smartphone may be able to communicate data, such as a streaming media file, to the television or to instruct the television to request and play such a streaming media file.

These and other aspects of the present disclosure may improve the process for pairing two multimedia devices, such as simplifying the pairing process and decreasing user actions. Aspects of the present disclosure also permit devices to be paired with less specialized device features than may be conventionally employed (e.g., without requiring a device to support a specific protocol such as the DIAL protocol or the like). As such, embodiments of the present disclosure may enable more devices to be paired in a simple manner than by conventional pairing technologies.

FIG. 1 illustrates an exemplary system architecture 100 for the pairing of multimedia devices, in accordance with an embodiment of the disclosure. For ease of explanation, the illustrated embodiment includes a pairing service as part of a content-sharing platform. This done solely for clarity in explanation. The scope of the present disclosure extends well beyond the specific embodiments presented herein.

The system architecture 100 includes a plurality of client devices, illustrated as a first-screen device 110 and a second-screen device 120. The system architecture 100 further includes a local communications channel 126, which may be a local network, such as a wireless network (e.g., Wi-Fi, Bluetooth®, etc.) or a wired network (e.g., an Ethernet network). The first-screen device first-screen device 110 and second-screen device 120 may communicate directly with each other via the local communications channel 126 in some embodiments. Additionally, the first-screen device 110 and the second-screen device 120 may exchange communication less directly through the local communications channel 126 and the network 128, in some embodiments. The devices first-screen device 110 and/or second-screen device 120 may communicate with a content-sharing platform 130, a push notification server 160, and a data store 170 over the network 128.

In one embodiment, network 128 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 170 includes a memory (e.g., random access memory), a cache, a drive (e.g., a hard drive), a flash drive, a database system, a storage area network (SAN), or another type of component or device capable of storing data. The data store 170 may also include multiple storage components (e.g., multiple drives or multiple databases) that may also span multiple computing devices (e.g., multiple server computers) and storage devices such as may be present in a data center. Thus, in some embodiments, the data store 170 may be a data center.

The devices 110 and 120 may include computing devices such as personal computers (PCs), laptops, smartphones, tablet computers, wearable computing devices, set-top boxes (STBs), televisions, etc. The devices 110 and 120 may be referred to as "multimedia devices", as these devices are able to receive, process, and/or play media items. For ease of explanation, the first-screen device first-screen device 110 may be a television and the second-screen device 120 may be a smartphone in many of the examples provided herein. devices 110 and 120 may be used to consume (e.g., view, hear, etc.) content from the content-sharing platform 130 or from other sources, such as over-the-air television transmitters, cable and satellite television transmitters, the Internet, etc.

As illustrated, both the devices 110 and 120 include a media viewer 112. In one embodiment, the media viewers 112 may be applications that allow users to receive media items including visible content, such as images, videos, web pages, text, documents, etc., and/or audio content from one or more sources. For example, the media viewer 112 may be a web browser that can access, retrieve, present, and/or navigate content (e.g., web pages such as Hyper Text Markup Language (HTML) pages, digital media items, etc.) served by a web server. The content may be received as a set of instructions or data. If the first screen device 110 is a television, the media viewer 112 of the first-screen device 110 may be a combination of hardware and software on the television to render signals for presentation. The media viewer 112 may render, display, and/or present the content (e.g., a web page, a media viewer) from the received instructions on the client device to a user consuming the content. The media viewer 112 may also display an embedded media player (e.g., a Flash® player or an HTML5 player) that is embedded in a web page (e.g., a web page that may provide information about a product sold by an online merchant, a content-sharing platform such as a social network with social posts and comments). The media viewer 112 may also render or present audio components of the content on a sound system of a client device.

In another example, the media viewer 112 may be a standalone application, such as smartphone application or "app," that allows users to consume digital media items (e.g., digital videos, digital images, electronic books, shared text, etc.) as part of the content-sharing platform 130. Additionally, the media viewer 112 may provide a user interface, or receive instructions or data including a user interface from the content-sharing platform 130 to enable users to upload and manage content.

The first-screen device 110 may further include an authentication service 114 which may receive credentials from a device, such as the second-screen device 120, to authorize that device to exercise a degree of control over the first-screen device 110. The credentials may be at least one of a username, a password, or a token, etc. For example, if the second-screen device 120 provides the appropriate credentials to the first-screen device 110, the second-screen device 120 may be able to control certain features of the first-screen device 110, such as changing the channel or instructing the first-screen device 110 to request content from the content-sharing platform 130 for presentation on a display of the first-screen device 110. The first-screen device 110 may include a communication service 116 to enable the first-screen device 110 to communicate with the second-screen device 120, the content-sharing platform 130, and other sources as described herein.

The second-screen device 120 may include a media viewer 112 as described above, and may further include a notification service 122 and a message service 124. The notification service 122 may receive messages from the push notification server 160 over the network 128. Such messages may be referred to herein as "push notifications" or "cloud-to-device notifications." The message service 124 may allow local messages to be displayed to a user of the second-screen device 120. For example, the message service 124 may receive a message from an application or "app" running in the background of the second-screen device 120 and present it as a message, alert, pop-up, etc., to the user of the device second-screen device 120. Both the messages handled by the message service 124 and the notifications received by the notification service 122 may include text that is rendered on a display of the second-screen device 120 and information or data that is not rendered on the display. In some embodiments, the notification service 122 may receive and process one or more notifications from the push notification server 160 and not display the notification to the user of the second-screen device 120. Such notifications may be processed in the background of the second-screen device 120.

As illustrated in FIG. 1, the devices 110 and 120 may communication with the content-sharing platform 130 over the network 128.

In some embodiments, the content-sharing platform 130 may include one or more computing devices (such as a rack-mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a mobile computing application or STB application (e.g., an "app") that may be used to provide a user with access to the media items.

The content-sharing platform 130 may include a media item storage 132 that includes a plurality of media items, such as exemplary media items 134A and 134B. Examples of media items 134A and 134B can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, text-based messages, social posts, etc. As used herein, "media," media item," "online media item," "digital media," "digital media item," "content," and "content item" can include and refer to an electronic file that can be executed, loaded, or played using software, firmware, or hardware configured to present the digital media item to a viewing user of the content-sharing platform 130.

The content-sharing platform 130 may further include a user service 136. The user service 136 may include a data store 138 that stores account data. As shown in FIG. 1, the data store 138 stores account data 140A and account data 140B. The account data 140A and 140B may include databases and/or table of information about or associated with accounts of users of the content-sharing platform, individually and/or collectively. The data store 138 may include multiple user accounts. For example, the account data 140A may be a user account for a user that owns the first-screen device 110 and the second-screen device 120. In order to access the content-sharing platform 130 from the devices 110 and 120, the user may log into the content-sharing platform 130 from both of the devices 110 and 120. The account data 140A may include information identifying both of the devices 110 and 120 such as identifiers that may be used to identify and facilitate communication with multiple devices with which the user has logged into the content-sharing platform 130.

The information from the user service 136 may be used by a device pairing service 150. In some embodiments, the device pairing service 150 may be provided separately from and independent of the content-sharing platform 130. In such instances, the device pairing service 150 may include or have access to the user service 136 or a comparable user service. The device pairing service 150 may receive a request from the user to pair devices associated with the user. In some embodiments, when the first-screen device 110 connects to the pairing service 150, the pairing service 150 may automatically initiate a pairing process to enable the first-screen device 110 to be paired with any other devices associated with the user in the account data 140A. As illustrated in FIG. 1, a pairing process may be initiated to enable the pairing of the first-screen device 110 and second-screen device 120.

As part of the pairing process, the device pairing service 150 may generate a pairing code and send a request to the push notification service 160. A notification service 162 operating on the push notification server 160 may include the pairing code in a push notification. The pairing service 150 may request that such notifications be sent to all devices listed in the account data 140A that are capable of pairing with the first-screen device 110. In some embodiments, the pairing service 150 may request that such notifications be sent to the devices that are associated with the user, as indicated by the user data 140A, and are currently logged into the content-sharing platform 130. Thus, notifications may be sent by the notification service 162 to the second-screen device 120 and other devices. In some embodiments, the pairing process may be initiated automatically, but with certain limits. For example, in some embodiments, the pairing process may only be initiated a certain number of times within a certain period, such as three times in a month or five times in a year.

The pairing code may be sent by the push notification server 160 to the second-screen device 120 over the network 128 or another network. The pairing code may be a temporary, custom-generate code and may be valid for a particular pairing session. The pairing code may be associated with session information and may include information identifying the first-screen device 110 and information requesting the location of the first-screen device 110.

When the second-screen device 120 receives the notification, the notification is processed by the notification service 122. In some embodiments, the notification service 122 may provide an alert to the user of the second-screen device 120. In other embodiments, the notification service 122 does not provide an indication to the user that the notification has been received. The notification service 122 may extract the pairing code from the notification. The second-screen device 120 then sends a request, including the pairing code, to the pairing service 150 to pair with the first-screen device 110. This request to pair with the first-screen device 110 may be a request for credentials in order to pair with the first-screen device 110.

The pairing service 150 may receive the request containing the pairing code from the second-screen device 120 and confirm that the pairing code matches the pairing code that was sent to the notification server 160. The pairing service 150 may also perform a check to determine whether the first-screen device 110 is still on-line and able to pair with the second-screen device 120. The pairing service 150 may also perform a check to determine whether the first-screen device 110 and the second-screen device 120 are located near each other or proximate to each other. This may be done by determining whether the devices 110 and 120 are connected to the content-sharing platform 130 and/or the pairing service 150 via the same network, i.e., the local communication channel 126. Some geographical information may be gathered from other sources, such as GPS coordinates provided by the first-screen device 110 and/or second-screen device 120.

If the pairing code matches, the first-screen device 110 is available, and the devices 110 and 120 pass the location check, the pairing service 150 may respond to the second-screen device 120 with a confirmation. The confirmation may include credentials and a text-based message. The confirmation may indicate to the user that the pairing service 150 has associated the devices 110 and 120 as paired devices in in the user's account data, i.e. user data 140A. The confirmation may be received by the second-screen device 120. The confirmation may be presented to the user by the message service 124. The message service 124 may present the message of the confirmation as an alert, a banner, a pop-up, etc., such that the message is presented to the user regardless of which app is (or apps are) running in a foreground of the device second-screen device 120.

The message presented to the user of the second-screen device 120 by the message service 124 may further include interface elements for receiving a request from the user to finalize the pairing of the devices 110 and 120. For example, the message may state "Do you want to pair this phone with your television?" and provide buttons or other elements for the user to indicate "yes" or "no." If the user indicates "yes", the user thereby requests to send the credentials received in the confirmation to the device first-screen device 110. The credentials may be sent over the local communications channel 126. The first-screen device 110 may store the credentials on a data store of the first-screen device 110 or the credentials may be stored in the user's account data 140A. The first-screen device 110 may then authenticate the credentials and use them to finalize the pairing process. After the pairing process is finalized, the user may use the second-screen device 120 to control the first-screen device 110. For example, the user may be able to select the media item 134A on the content-sharing platform 130 via the second-screen device 120, which may cause the first-screen device 110 to request the media item 134A from the content-sharing platform 130. The media item 134A may then be played on the first-screen device 110. In this way, the pairing device 150 may facilitate the pairing of the devices 110 and 120.

Figure 2:
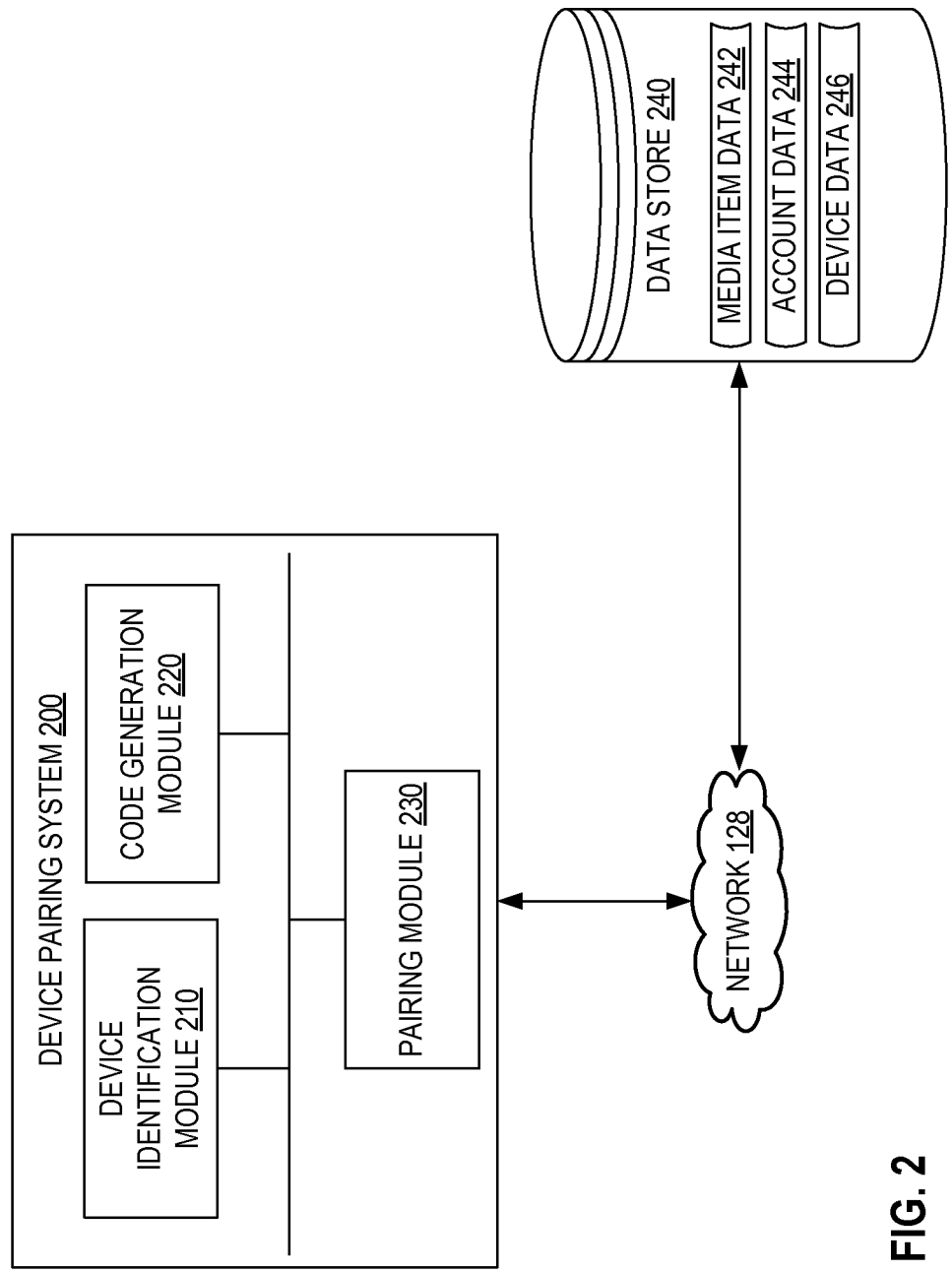
FIG. 2 is a block diagram of a pairing system, in accordance with some embodiments of the disclosure.

Referring to FIG. 2, shown therein is a block diagram of a device pairing system 200, such as the device pairing service 150 of FIG. 1, as described above. The device pairing system 200 may include several modules that provide the different functions that may be called upon in pairing devices, such as devices 110 and 120. As illustrated, the pairing system 200 includes a device identification module 210, a code generation module 220, and a pairing module 230. These modules 210, 220, 230 may be in communication with each other and with a data store 240 via the network 128. The modules 210, 220, and 230 may work in cooperation to pair multimedia devices.

The device identification module 210 may identify one or more devices in many different ways. For example, the device identification module 210 may retrieve information from data communications between one or more devices and the device pairing system 200 and/or may retrieve information from the account data 244 stored on the data store 240. For example, the account data 244 may include one or more user accounts. A user account may include a listing of all of the devices that have been logged into the account along with sufficient information to enable communication with these devices. The device identification module 210 may also determine which devices are online. For example, when the first-screen device 110 comes online and is connected to the content-sharing platform 130, the device identification module 210 may set a flag to indicate that the first-screen device 110 is available to the pairing system 200.

The code generation module 220 may respond to a request to initiate a device pairing process by generating a pair code as described above. The request may be automatically issued by the device identification module 210 upon identifying that the first-screen device 110 is online and available to pair with one or more devices associated with the user's account. If all devices that can be paired with the first-screen device 110 have already been paired as indicated by the user data 244, then the device identification module 210 may forego initiating a pairing process. After the code generation module 220 generates the pairing code, the code generation module 220 may send the pairing code to a push notification service, such as the notification service 162 operating on the push notification server 160 as shown in FIG. 1. The push notification service enables the distributed handling and delivery of "cloud-to-device" messages. The notification service may receive the pairing code from the code generation module 220 and then include the pairing code in a notification sent to one or more devices associated with the user's account.

The receiving device or devices, such as the second-screen device 120, may respond to receipt of the notification by sending the notification to the pairing system 200 as part of a request for pairing credentials. The pairing code may be sent automatically by the receiving device, without requiring or receiving a responsive, affirmative user request in response to the receipt of the pairing code contemporaneously with the receipt of the pairing code by the second-screen device 120. The pairing module 230 may receive the pairing code and confirm that the pairing code received from the second-screen device 120 corresponds to the pairing code sent to the notification service 162. In response, the pairing module 230 may access or generate credentials for use by the second-screen device 120 in pairing with the first-screen device 110, and then send those credentials to the device second-screen device 120. The credentials may be sent with a confirmation message that indicates to the user of the first-screen device 110 that the pairing system 200 has associated the devices 110 and 120 as being paired. This information may be stored in the user data 244 and/or device data 246 by the device identification module 210.

After receiving the credentials and the confirmation, the second-screen device 120 may use the credentials to pair with the first-screen device 110 over the local communication channel 126. Thereafter, the second-screen device 120 may be controlled by the user to control the first-screen device 110.

Figure 3:
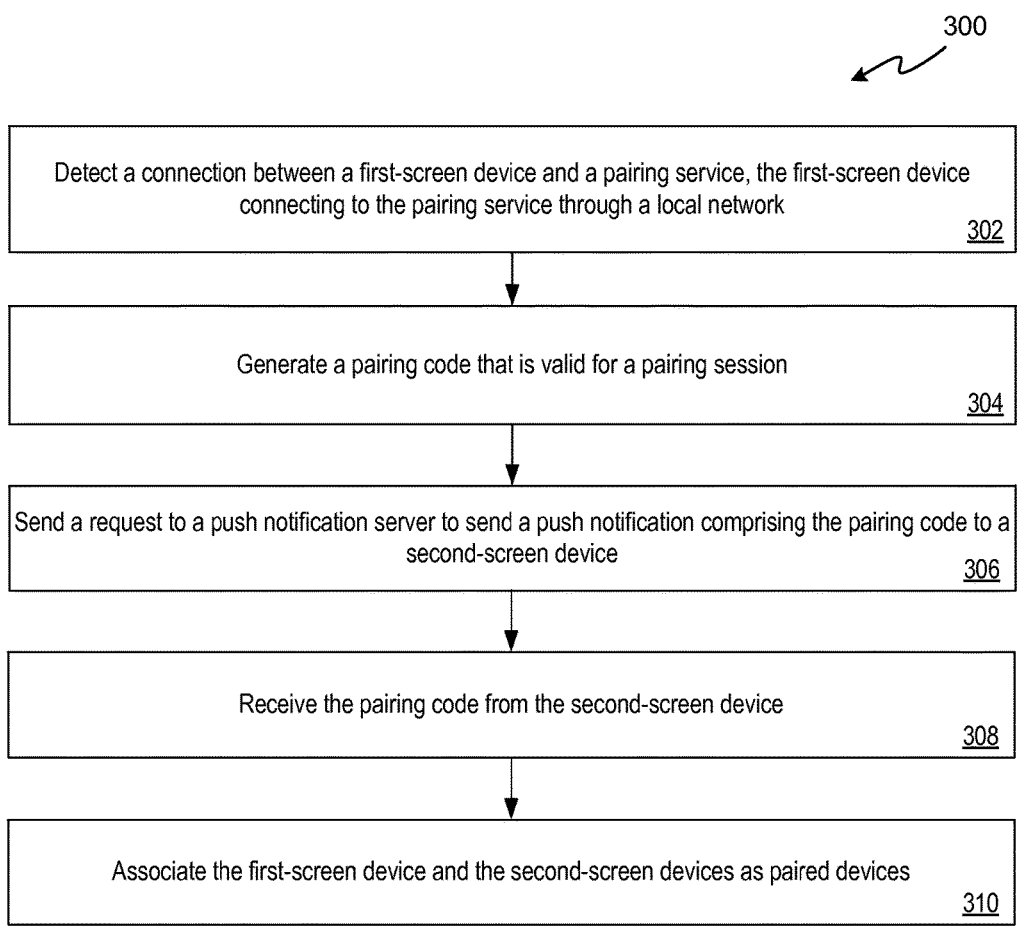
FIG. 3 is a flow diagram of a method of pairing multimedia devices, in accordance with some embodiments of the disclosure.

FIG. 3 is a flow diagram of a method 300 of pairing multimedia devices such that one device may be used to control the other, according to some aspects of the present disclosure. The method 300, and other methods described herein, may be performed by processing logic that comprises hardware (e.g., circuitry, dedicated logic, programmable logic, microcode, etc.), software (e.g., instructions run on a processing device to perform hardware simulation), or a combination thereof. For example, the method 300 may be performed by the device pairing service 150 of FIG. 1 or by the device pairing system 200 of FIG. 2, both of which are described above.

For simplicity of explanation, the method 300 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

Embodiments of the method 300 may begin at block 302 in which processing logic detects a connection between a first-screen device and a pairing service, the first-screen device connecting to the pairing service through a network. For example, when the first-screen device 110 connects to the content-sharing platform 130 over the network 128, the device identification module 210 may detect that the first-screen device 110 is connected to the pairing service 150 as well. Additionally, the device identification module 210 may determine that the first-screen device 110 is associated with a particular user account, and may identify other devices, such as the second-screen device 120, that are associated with the same account. At block 304, the processing logic generates a pairing code. The pairing code may be valid for a pairing session. For example, the code generation module 220 of the device pairing system 200 may generate a pairing code. The pairing code may be temporary, valid only for a current session, and associated with the session information including the identifier of the first-screen device and the location of the first-screen device determined as described herein.

At block 306, the processing logic may send a request to a push notification server to send a push notification comprising the pairing code to a second-screen device. For example, the pairing module 230 may send a request to the push notification server 160, with the pairing code, and request that the server 160 send a notification including the pairing code to the second-screen device 120. Where multiple devices are identified by the device identification module 210 for possible pairing with the first-screen device 110 (e.g., devices associated with the same user name), the request to the server 160 may be a request to send the notification to each of these devices, or to each of the devices that are able to receive the notification from the server 160. The user may be signed into his or her content sharing platform account either both on the first-screen device 110 and the second-screen device 120 or on the first-screen device 110 but not the second-screen device 120.

At block 308, the processing logic receives the pairing code from the second-screen device. For example, after receiving the notification from the push notification server 160, the second-screen device 120 may respond by sending the pairing code to the pairing system 200 as part of a request to pair with the first-screen device 110. The pairing code may be received and processed by the pairing module 230, which may then determine whether the pairing code is valid (e.g., using the session information associated with the pairing code). The pairing module 230 may perform multiple checks before sending pairing credentials to the second-screen device 120. For example, the pairing module 230 may check with the device identification module 210 to determine whether the first-screen device 110 is still online and available for pairing. Additionally, the pairing module 230 may receive information from the device identification module 210 to determine whether the first-screen device 110 and the second-screen device 120 are suitable for pairing. This may be done by determining that the devices 110 and 120 are in proximity to each other. The GPS information provided by the devices 110 and 120 when they are accessing the pairing system 200 and/or the content-sharing platform 130 or IP addresses by which the devices 110 and 120 are accessing the pairing system 200 and/or the content-sharing platform 130 may be compared to determine this proximity.

Upon receiving the pairing code from the second-screen device 120, the pairing module 230 may send credentials and a confirmation message to the second-screen device 120. The credentials may be used by the second-screen device 120 in finalizing the pairing with the first-screen device 110.

At block 310, the processing logic may associate the first-screen device and the second-screen devices as paired devices. For example, the device identification module 210 or the pairing module 230 may include an entry in the user data 244 and/or the device data 246 that indicates that the devices 110 and 120 are have been paired or that the credentials have been sent to the second-screen device 120 to enable it to pair with the first-screen device 110, and thus, that the portions of pairing for which the pairing system 200 is responsible have been completed.

Figure 4:
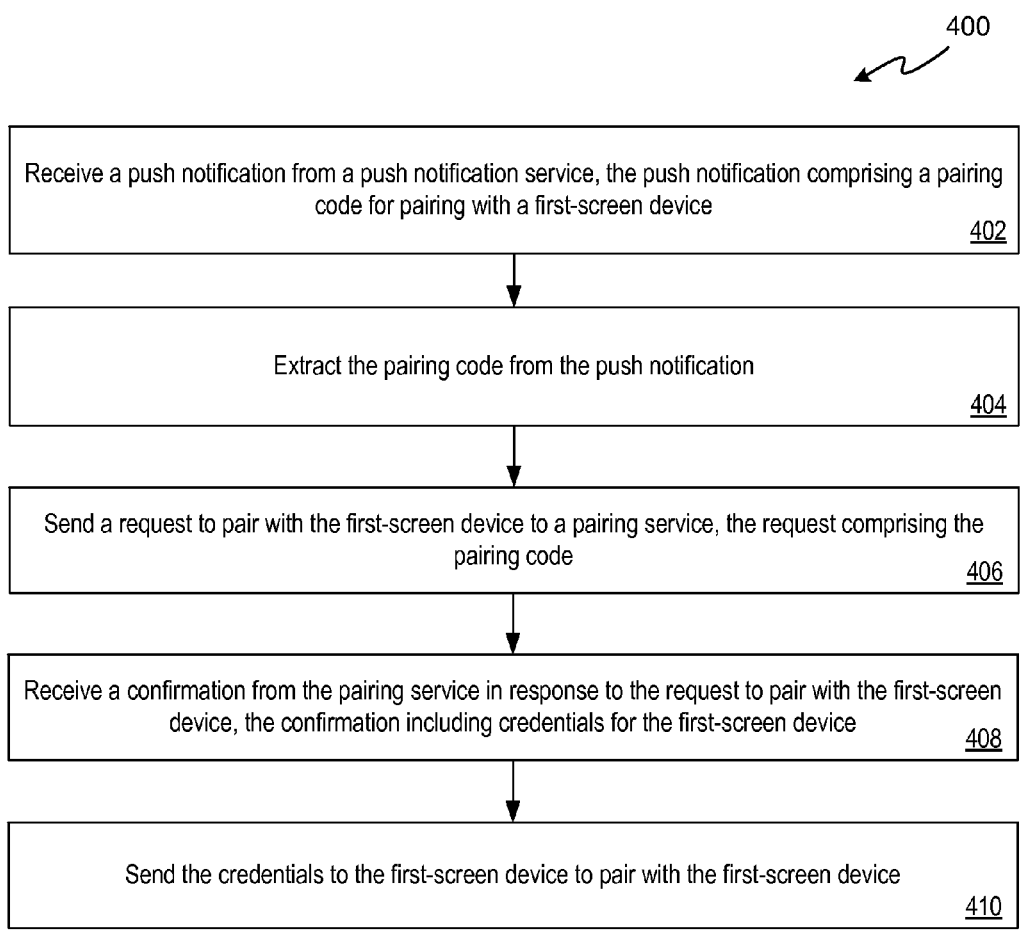
FIG. 4 is a flow diagram of another method of pairing multimedia devices, in accordance with some embodiments of the disclosure.

FIG. 4 is a flow diagram of a method 400 of pairing multimedia devices such that one device may be used to control the other, according to some aspects of the present disclosure. Some embodiments of the method 400 may be performed by the second-screen device 120 as included in FIG. 1 and as described herein. Embodiments of the method 400 may begin at block 402, at which processing logic receives a notification from a push notification service. The notification includes a pairing code for pairing with a first-screen device. For example, the notification service 122 operating on the second-screen device 120 may receive the notification from the notification service 162. The notification service 122 may also extract the pairing code from the notification, at block 404 at which the processing logic extracts the pairing code from the push notification. In some embodiments, the notification service 122 may check a permission setting prior to extracting the pairing code. This may be done without affirmative action on the part of the user in response to the particular notification. If the user has requested that such notifications are not to be processed, for example by specifying that notification sent at the request of the content-sharing platform 130 should not be automatically handled, the pairing code may not be extracted and the method 400 may end without completing the pairing process.

At block 406, the processing logic may send a request to pair with the first-screen device to a pairing service, the request comprising the pairing code. For example, the second-screen device 120 may send the pairing code to the device pairing service 150, and/or the pairing system 200, over the network 128. The pairing service 150 may process the request by verifying the validity of the pairing code and performing one or more checks. For example, the pairing service 150 may determine whether the first-screen device 110 is still online and available for pairing and whether the devices 110 and 120 are located in proximity to each other. For example, the pairing service 150 may use IP addresses of both the first-screen device 110 and the second-screen device 120 to determine that both devices 110 and 120 are coupled to the network 128 by the local communications channel 126, which may be a home network.

At block 408, the processing logic may receive a confirmation from the pairing service in response to the request to pair with the first-screen device. The confirmation may include or be sent in association with credentials for the first-screen device. For example, the pairing service 150 may send the confirmation and credentials to the second-screen device 120. The second-screen device 120 may receive the confirmation and the message service 124 may cause a message from the confirmation to appear to the user of the second-screen device 120. The message service 124 may cause the message to appear in a display of the second-screen device 120 even if the media viewer 112, or another app communicating with the pairing service 150, is operating in a background of the second-screen device 120. At block 410, the processing logic may send the credentials to the first-screen device to pair with the first-screen device. The second-screen device 120 may send the credentials to the first-screen device 110 over the local communications channel 126 to request that the first-screen device 110 pair with the second-screen device 120.

After the first-screen device 110 receives the credentials, the first-screen device 110 may finalize the pairing with the second-screen device 120 such that the second-screen device 120 may control at least some aspects and features of the first-screen device 110. For example, after the pairing is finalizes, the second-screen device 120 may be used by the user to make a selection of the media item 134A, made accessible by the content-sharing platform 130, to play on the first-screen device 110. The first-screen device 110 may receive the request from the second-screen device 110 and then request the media item 134A from the content-sharing platform 130, and play the media item 134A on a display of the first-screen device 110 or a display coupled thereto in embodiments in which the first-screen device 110 does not include a display (e.g., embodiments in which the first-screen device 110 is a game console, an STB, or a similar device).

Figure 5:
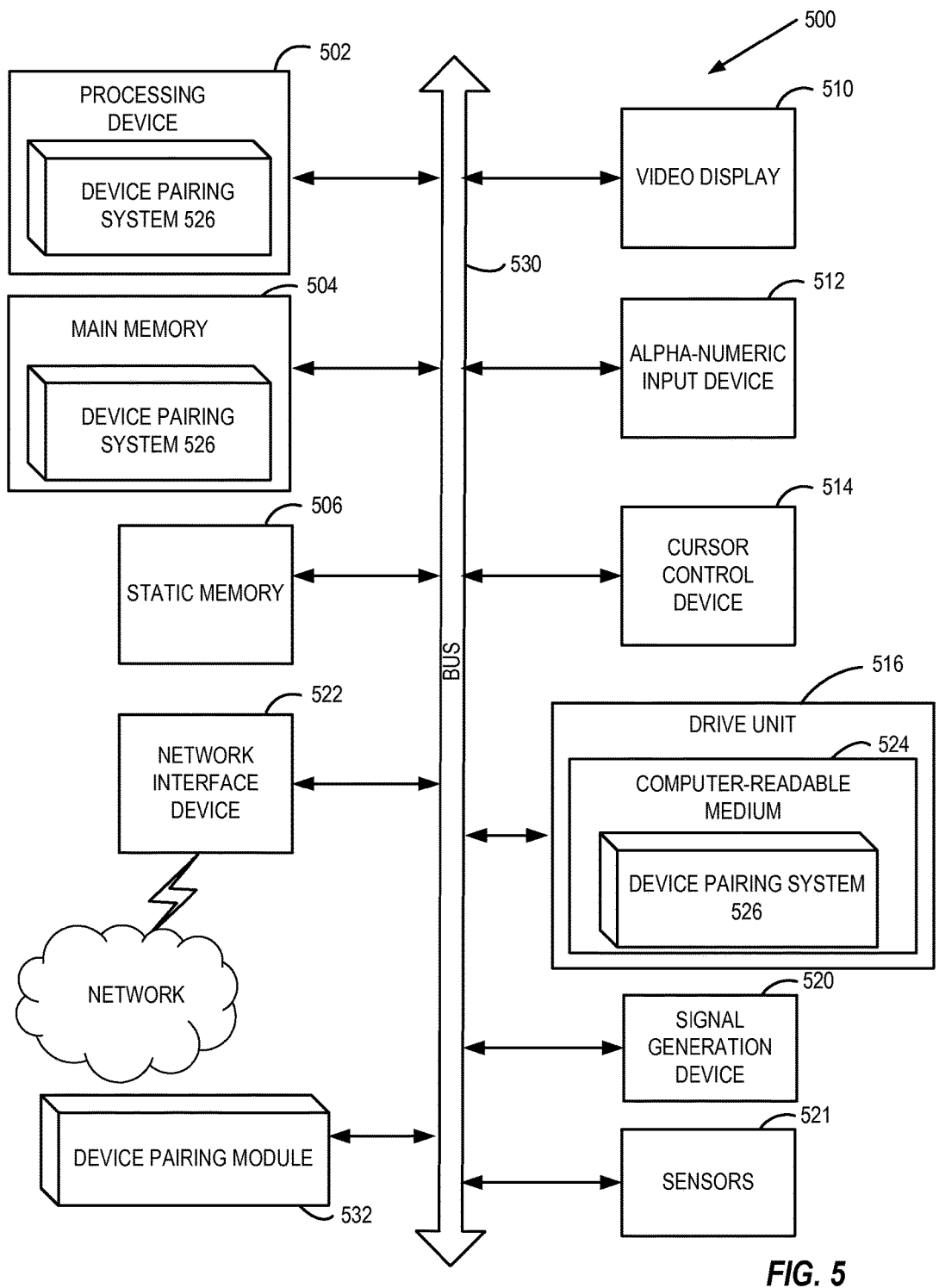
FIG. 5 is a block diagram illustrating an exemplary system architecture, according to some embodiments.

FIG. 5 illustrates a diagrammatic representation of a machine in the exemplary form of a computing system 500. Embodiments of the computing system 500 may provide the first-screen device 110, the second-screen device 120, content-sharing platform 130, or the pairing system 200 as described herein. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a gaming console, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for pairing multimedia devices (e.g., a first-screen device and a second-screen device), such as embodiments of the methods 300 and 400 as described above. In one embodiment, the computing system 500 represents various components that may be implemented in the pairing system 200, the second-screen device 120, or the content-sharing platform 130 as described above. Alternatively, the server computing system 104 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., device pairing system 526, instructions for the message service 124 or the notification service 122, etc.) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker), and one or more sensors 521.

The data storage device 516 may include a computer-readable storage medium 524 on which is stored one or more sets of instructions (e.g., device pairing system 526) embodying any one or more of the methodologies or functions described herein. The device pairing system 526 may also reside, completely or at least partially, within the main memory 504 and/or within the processing device 502 during execution thereof by the computing system 500, the main memory 504 and the processing device 502 also constituting computer-readable storage media. The device pairing system 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The device pairing system, components, and other features described herein can be implemented as discrete hardware components or integrated in the functionality of hardware components such as ASICS, FPGAs, DSPs, or similar devices. The device pairing module 532 may implement operations of device pairing as described herein. In addition, the device pairing module 532 can be implemented as firmware or functional circuitry within hardware devices. Further, the device pairing module 532 can be implemented in any combination hardware devices and software components.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "modifying", "determining", "receiving", "identifying", "generating", "maintaining", "transmitting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:

detecting a connection between a first-screen device and a pairing service, the first-screen device connecting to the pairing service through a network, wherein the first-screen device is a television set associated with a user account;

generating, by a processing device, a pairing code to pair the first-screen device associated with the user account with at least one other device associated with the user account, wherein the pairing code is generated for a pairing session to be valid exclusively during the pairing session by associating the pairing code with session information of the pairing session, the session information comprising an identifier of the first-screen device;

identifying a second-screen device associated with the user account, wherein the second screen device is a mobile device associated with the user account;

sending a request to a push notification server to send a push notification comprising the pairing code to the second-screen device associated with the user account;

receiving, by the processing device, the pairing code from the second-screen device associated with the user account;

upon determining that the paring code received from the second-screen device associated with the user account matches the pairing code valid for the pairing session, determining whether the first-screen device is still online and whether the first-screen device and the second-screen device satisfy a geographic location check; and in response to determining that the first-screen device is still online and that the first-screen device and the second-screen device satisfy the geographic location check, associating the first-screen device and the second-screen device as paired devices to allow the second-screen device to control playback of media content on the first-screen device during the pairing session.

2. The method of claim 1, wherein identifying a second-screen device associated with the user account comprises:

identifying a plurality of devices associated with the user account, the plurality of devices comprising the second-screen device, and wherein sending the request to send the push notification to the second-screen device comprises sending a request to send the push notification to each of the plurality of devices associated with the user account other than the first-screen device.

3. The method of claim 1, wherein determining whether the first-screen device and the second-screen device satisfy a geographic location check comprises comparing an internet protocol (IP) address associated with the first-screen device with an IP address associated with the second-screen device.

4. The method of claim 1, further comprising sending a confirmation to the second-screen device to permit the second-screen device to present a message to a user having the user account regarding the association of the first-screen device and the second-screen devices as paired devices, the confirmation including credentials for the first-screen device.

5. The method of claim 4, wherein the message is to be presented to the user of the second-screen device outside of an application user interface associated with the pairing service.

6. A system comprising:

a memory to store instructions thereon; and a processing device communicably coupled to the memory, the processing device to execute the instructions to:

detect a connection between a first-screen device and a pairing service, the first-screen device connecting to the pairing service through a network, wherein the first-screen device is a television set associated with a user account;

generate a pairing code to pair the first-screen device associated with the user account with at least one other device associated with the user account, wherein the pairing code is generated for a pairing session to be valid exclusively during the pairing session by associating the pairing code with session information of the pairing session, the session information comprising an identifier of the first-screen device;

identify a second-screen device associated with the user account, wherein the second screen device is a mobile device associated with the user account;

send a request to a push notification server to send a push notification comprising the pairing code to the second-screen device associated with the user account;

receive the pairing code from the second-screen device associated with the user account;

upon determining that the paring code received from the second-screen device associated with the user account matches the pairing code valid for the pairing session, determine whether the first-screen device is still online and whether the first-screen device and the second-screen device satisfy a geographic location check; and in response to determining that the first-screen device is still online and that the first-screen device and the second-screen device satisfy a geographic location check, associate the first-screen device and the second-screen device as paired devices to allow the second-screen device to control playback of media content on the first-screen device during the pairing session.

7. The system of claim 6, wherein to identify a second-screen device associated with the user account, the processing device is to further execute the instructions to:

identify a plurality of devices associated with the user account, the plurality of devices comprising the second-screen device, and wherein sending the request to send the push notification to the second-screen device comprises sending a request to send the push notification to each of the plurality of devices associated with the user account other than the first-screen device.

8. The system of claim 1, wherein the determining whether the first-screen device and the second-screen device satisfy a geographic location check comprises comparing an internet protocol (IP) address associated with the first-screen device with an IP address associated with the second-screen device.

9. The system of claim 6, wherein the processing device is to further execute the instructions to send a confirmation to the second-screen device to permit the second-screen device to present a message to a user having the user account regarding the association of the first-screen device and the second-screen devices as paired devices, the confirmation including credentials for the first-screen device.

10. The system of claim 9, wherein the message is to be presented to a user of the second-screen device outside of an application user interface associated with the pairing service.

11. A computer-implemented method comprising:
receiving a push notification from a push notification service, the push notification comprising a pairing code for pairing with a first-screen device, wherein the first-screen device is a television set associated with a user account, and wherein the pairing code is generated for a pairing session to be valid exclusively during the pairing session by associating the pairing code with session information of the pairing session, the session information comprising an identifier of the first-screen device;
extracting, by a processing device of a second-screen device, the pairing code from the push notification, wherein the second screen device is a mobile device associated with the user account;
sending a request to pair the second-screen device with the first-screen device to a pairing service, the request comprising the pairing code, wherein the first-screen device is still online and the first-screen device and the second-screen device satisfy a geographic location check; and
receiving a confirmation from the pairing service in response to the request to pair with the first-screen device, the confirmation including credentials for the first-screen device and indicating that the second-screen device is allowed to control playback of media content on the first-screen device during the pairing session.

12. The method of claim 11, further comprising sending the credentials to the first-screen device to finalize pairing with the first-screen device.

13. The method of claim 11, further comprising checking a permission setting before extracting the pairing code from the push notification and before sending the request to pair with the first-screen device.

14. The method of claim 11, further comprising:
presenting a message regarding the confirmation on a display; and
receiving input from a user having the user account, the input comprising a request to pair with the first-screen device.

15. The method of claim 11, further comprising:
receiving a selection of a media item provided on a content-sharing platform, the selection received on the second-screen device; and
sending a command to the first-screen device to request the media item from the content-sharing platform.

16. The method of claim 11, wherein extracting the pairing code from the push notification and sending the request to pair with the first-screen device to the pairing service are performed without contemporaneous user action.

17. A non-transitory computer-readable medium comprising instructions, which when executed by a processing device, cause the processing device to perform operations comprising:
detecting a connection between a first-screen device and a pairing service, the first-screen device connecting to the pairing service through a network, wherein the first-screen device is a television set associated with a user account;
generating, by a processing device, a pairing code to pair the first-screen device associated with the user account with at least one other device associated with the user account, wherein the pairing code is generated for a pairing session to be valid exclusively during the pairing session by associating the pairing code with session information of the pairing session, the session information comprising an identifier of the first-screen device;
identifying a second-screen device associated with the user account, wherein the second screen device is a mobile device associated with the user account;
sending a request to a push notification server to send a push notification comprising the pairing code to the second-screen device associated with the user account;
receiving, by the processing device, the pairing code from the second-screen device associated with the user account;
upon determining that the paring code received from the second-screen device associated with the user account matches the pairing code valid for the pairing session, determining whether the first-screen device is still online and whether the first-screen device and the second-screen device satisfy a geographic location check; and
in response to determining that the first-screen device is still online and that the first-screen device and the second-screen device satisfy the geographic location check, associating the first-screen device and the second-screen device as paired devices to allow the second-screen device to control playback of media content on the first-screen device during the pairing session.

18. The non-transitory computer readable medium of claim 17, wherein identifying a second-screen device associated with the user account comprises:
identifying a plurality of devices associated with the user account, the plurality of devices comprising the second-screen device, and
wherein sending the request to send the push notification to the second-screen device comprises sending a request to send the push notification to each of the plurality of devices associated with the user account other than the first-screen device.

* * * * *